United States Patent [19]
Leonard

[11] 3,924,732
[45] Dec. 9, 1975

[54] APPARATUS FOR UNSCRAMBLING AND ORIENTING OVERCAPS

[75] Inventor: George E. Leonard, Davenport, Iowa

[73] Assignee: The Kartridg Pak Co., Davenport, Iowa

[22] Filed: Nov. 19, 1973

[21] Appl. No.: 416,738

[52] U.S. Cl. .................. 198/287; 198/255; 198/37
[51] Int. Cl.² ........................................... B65G 47/14
[58] Field of Search ......... 198/52, 53 R, 54, 56, 57, 198/58, 254, 255, 266–268, 276, 29, 30, 288, 37, 287; 222/56

[56] References Cited
UNITED STATES PATENTS

| | | | |
|---|---|---|---|
| 2,590,968 | 4/1952 | Hill | 198/54 |
| 2,609,912 | 9/1952 | Engel | 198/287 |
| 2,644,569 | 7/1953 | Francisco | 198/287 |
| 3,344,901 | 10/1968 | Schultz | 198/288 |
| 3,730,325 | 5/1973 | Goodwin | 198/288 |
| 3,835,985 | 9/1974 | Johnson | 198/268 |

Primary Examiner—Richard A. Schacher
Assistant Examiner—Joseph E. Valenza
Attorney, Agent, or Firm—Lockwood, Dewey, Zickert & Alex

[57] ABSTRACT

A machine for unscrambling and orienting overcaps used on aerosol cans, including a hopper receiving a supply of overcaps, an orientation device in the hopper for processing and lifting the caps out of the hopper and delivering them to a discharge conveyer in single file and upside down fashion, and an inspection and rejection station for inspecting the caps and returning those not properly oriented to the hopper for reprocessing.

7 Claims, 16 Drawing Figures

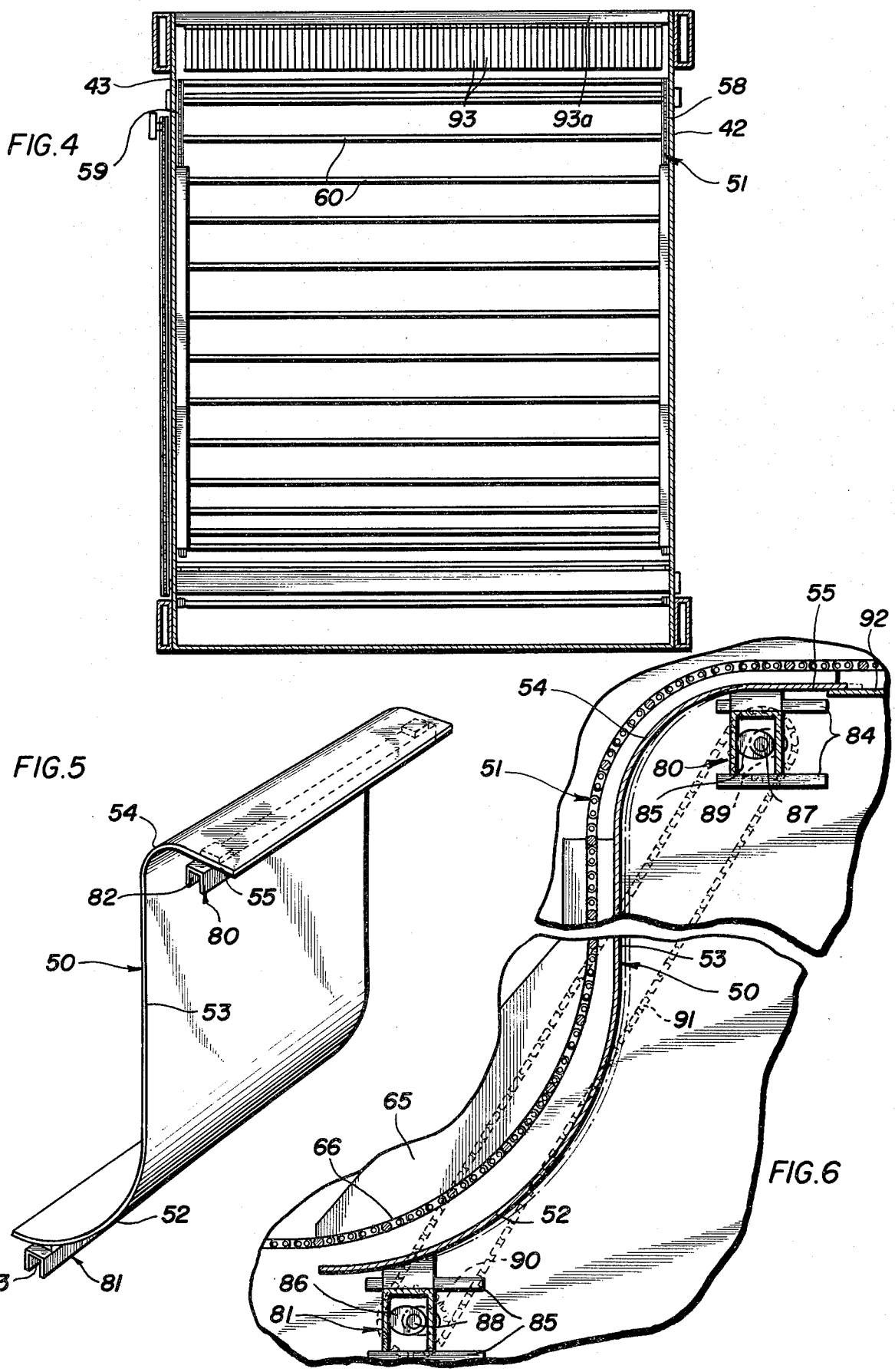

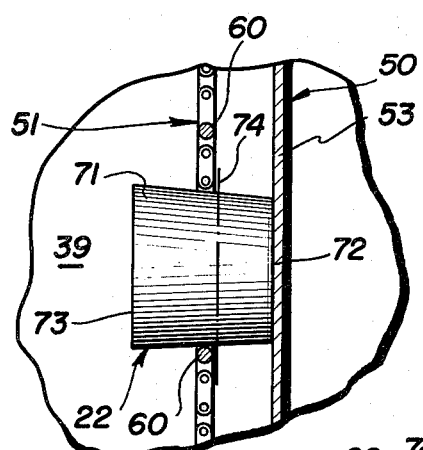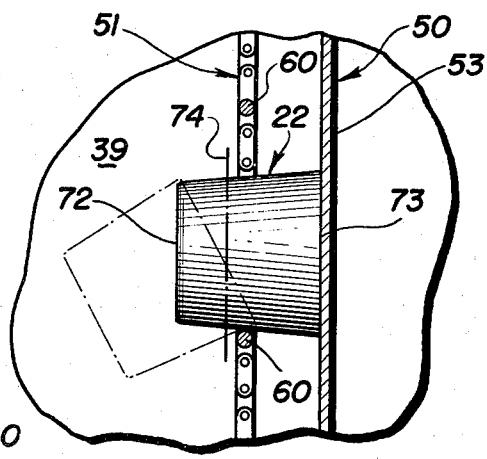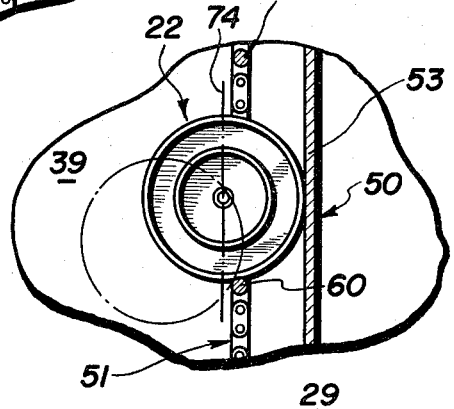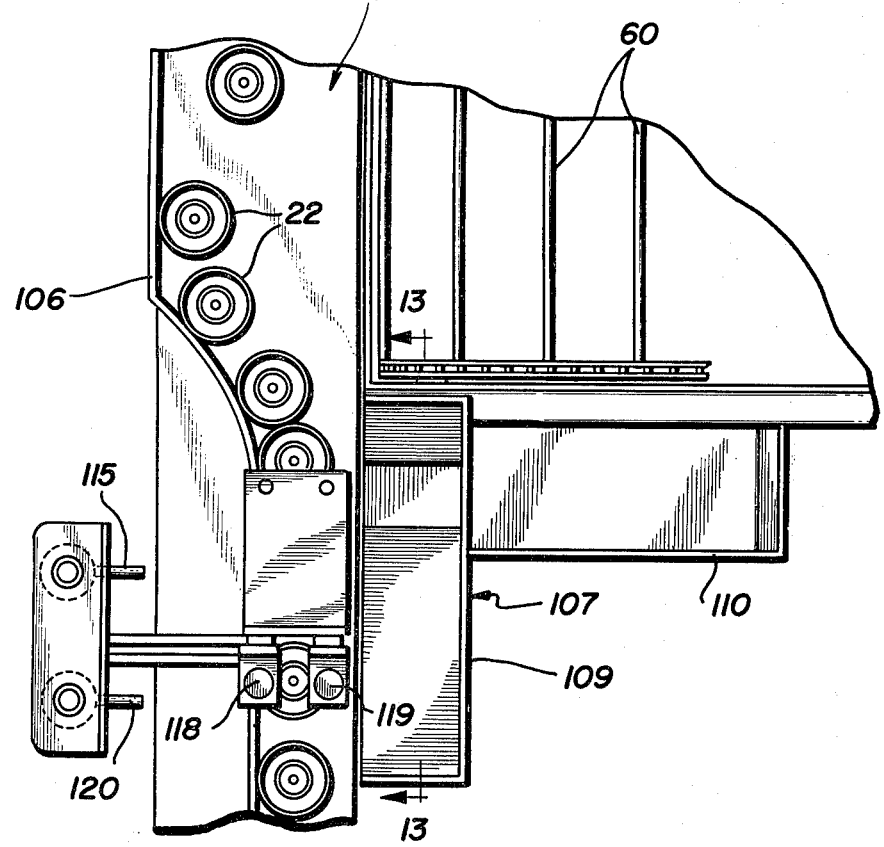

APPARATUS FOR UNSCRAMBLING AND ORIENTING OVERCAPS

This invention relates in general to an apparatus for unscrambling aerosol can overcaps so they may be placed on cans, and more particularly for an apparatus capable of accomplishing high-speed accurate orientation of aerosol can overcaps and the like.

The overcap unscrambler of the invention includes a hopper having a first compartment or section into which a supply of overcaps or caps is received and stored and a second compartment or section into which the caps are metered from the first compartment that may be termed an unscrambling compartment, where the caps are generally vertically lifted along a slide or wall by a ladder-like conveyer or pusher bar conveyor and, when properly oriented, lifted completely out of the compartment and transferred onto a discharge conveyer in single file. The ladder-like conveyer includes a plurality of horizontally extending parallel bars or rails substantially equally spaced apart. In the event the caps are not properly balanced by the center of gravity of each cap, they will tumble back down into the bottom of the unscrambling compartment. It will be understood the overcaps are generally cylindrical in cross section, generally open at the bottom end which mates with the chime of a can, generally closed at the top end, of a diameter greater than the height, and structured such that the center of gravity is closer to the top end. The vertical lift means or ladder-like conveyer includes horizontal flights, bars, or rails movable along a path adjacent to the slide and at a distance from the slide near the upper end such that overcaps will not be supported by the flights unless they are in properly oriented position. Accordingly, the improperly oriented overcaps on the flights will fall to the bottom of the unscrambling compartment to be thereafter picked up again by the ladder-like conveyor. The vertical lift device allows the overcaps to be "weighted" for a finite time regardless of the speed of the movable flights as compared to a rotary barrel-type machine that "weighs" the overcaps instantaneously and are therefore dependent upon constant machine speed. Moreover, the slide is adjustable very easily for handling different overcap sizes so that the machine may be easily set up to handle different overcaps. At the top of the slide, the overcaps are transferred to the discharge conveyer which advances the caps in single file to an inspection and rejection station which, after inspecting the caps, rejects caps that still may not be properly oriented and returns them to the unscrambling compartment of the hopper. Accordingly, the rejector inspects the caps for orientation, and if orientation is proper where the caps are in upside down position on the conveyer, the caps are moved onto the next station for further processing where they may be placed onto cans. Otherwise, the caps are returned to the unscrambling compartment of the hopper for reprocessing.

It is therefore an object of the present invention to provide a new and improved aerosol overcap unscrambler.

Another object of the present invention is in the provision of providing an improved aerosol unscrambler capable of unscrambling and placing overcaps on a conveyor in single file in an upside down position at a high rate of speed and accurately.

Still another object of the invention is to provide an improved aerosol overcap unscrambler that is small and compact in size, simple in construction, and which is capable of extremely easy and fast changeover for handling overcaps of different sizes.

A further object of the invention is to provide an apparatus for unscrambling and orienting overcaps, including an upstanding slide against which overcaps are moved by a pusher bar conveyer where means is provided to adjustably position the slide horizontally toward and away from the conveyer to handle various sizes of overcaps, and where means is provided to meter the supply of overcaps to the slide and conveyor.

Other objects, features and advantages of the invention will be apparent from the following detailed disclosure, taken in conjunction with the accompanying sheets of drawings, wherein like reference numerals refer to like parts, in which:

FIG. 4 is a vertical sectional view taken through the unscrambling compartment of the hopper and showing in elevation the ladder-like unscrambling conveyer;

FIG. 5 is a perspective view of the slide or wall from the unscrambling compartment of the hopper which coacts with the ladder-like conveyer to orient the overcaps;

FIG. 6 is a somewhat broken and fragmentary enlarged sectional view taken through the unscrambling compartment of the hopper to particularly illustrate the mechanism for adjusting the position of the slide relative to the ladder-like conveyer;

FIGS. 9, 10 and 11 are detailed side elevational and sectional views illustrating the function of the unscrambling conveyor and slide in the process of orienting overcaps;

FIG. 12 is a fragmentary top plan view of a portion of the discharge end of the unscrambling hopper and the adjacent reject station which inspects finally the orientation of the caps and returns any improperly oriented caps to the unscrambler hopper;

Figure 13:
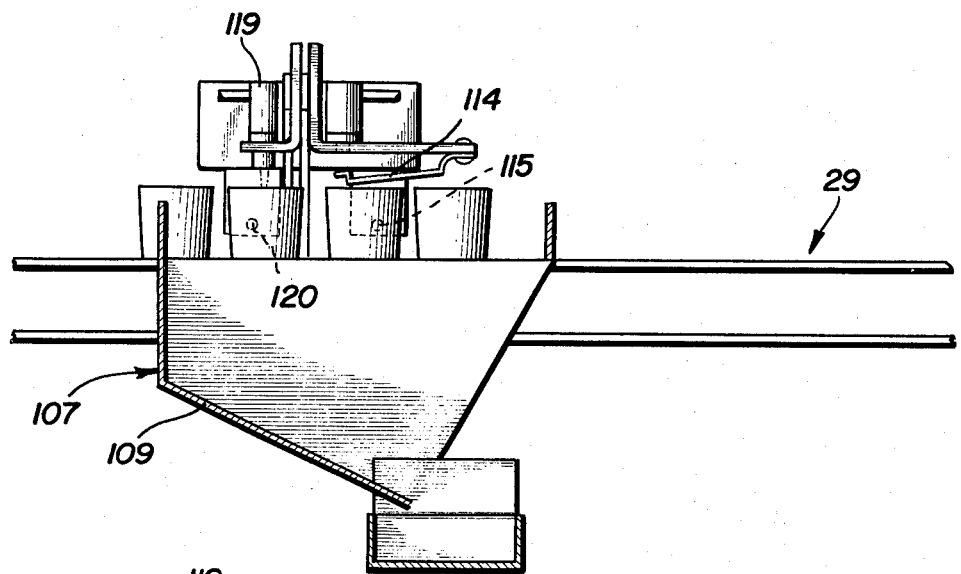
FIG. 13 is an elevational view of the fluidic apparatus at the reject station and taken generally along line 13—13 of FIG. 12 and further illustrating the inspection of caps passing through the station in proper orientation.
Figure 14:
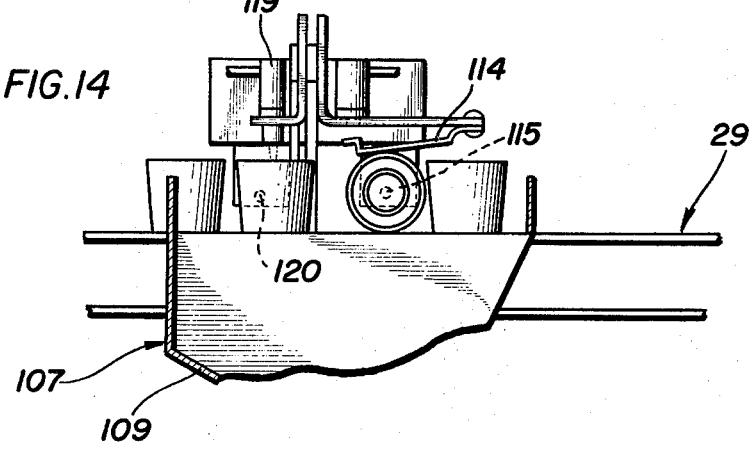
Figure 15:
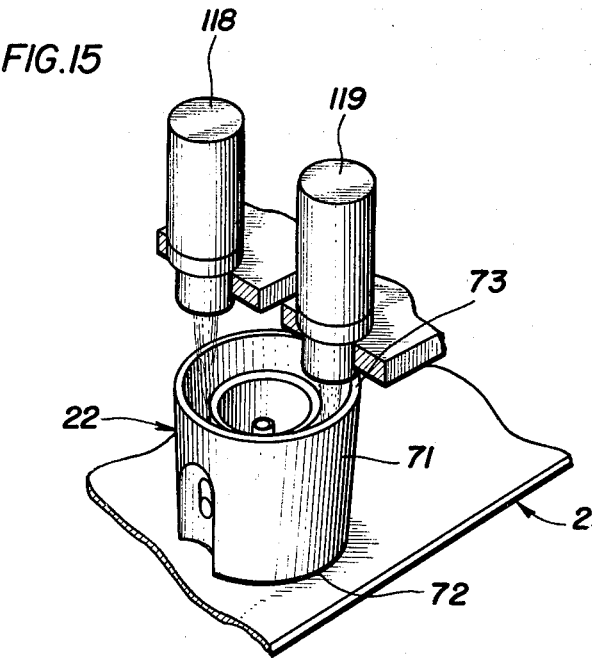
Figure 16:
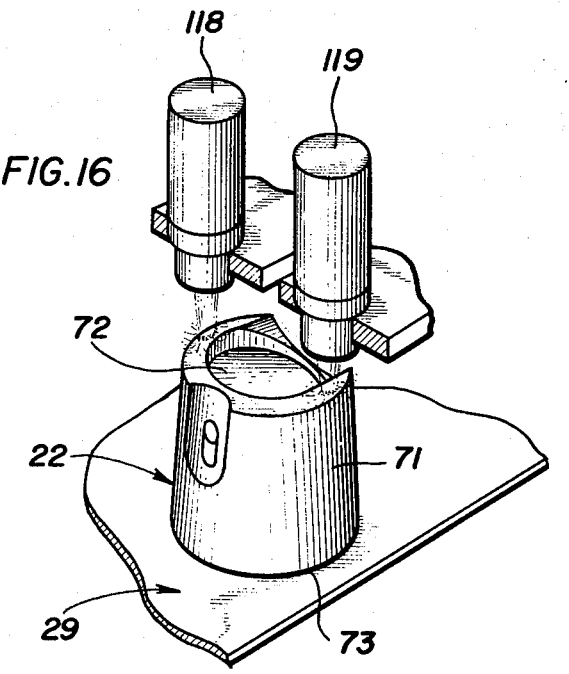

FIG. 14 is a view similar to FIG. 13 but illustrating the operation of the sensor which detects whether each cap is positioned on the conveyor upside down as desired or right-side-up and showing a cap on its side and operating the mechanical sensor which would cause rejection of the caps from the conveyer; and FIGS. 15 and 16 are perspective detailed views of the position portion of the reject station which inspects the position of the cap on the conveyer as to whether it is in the desired upside-down position or the undesirable right-side-up position so that it can be rejected if not properly oriented.

Figure 1:
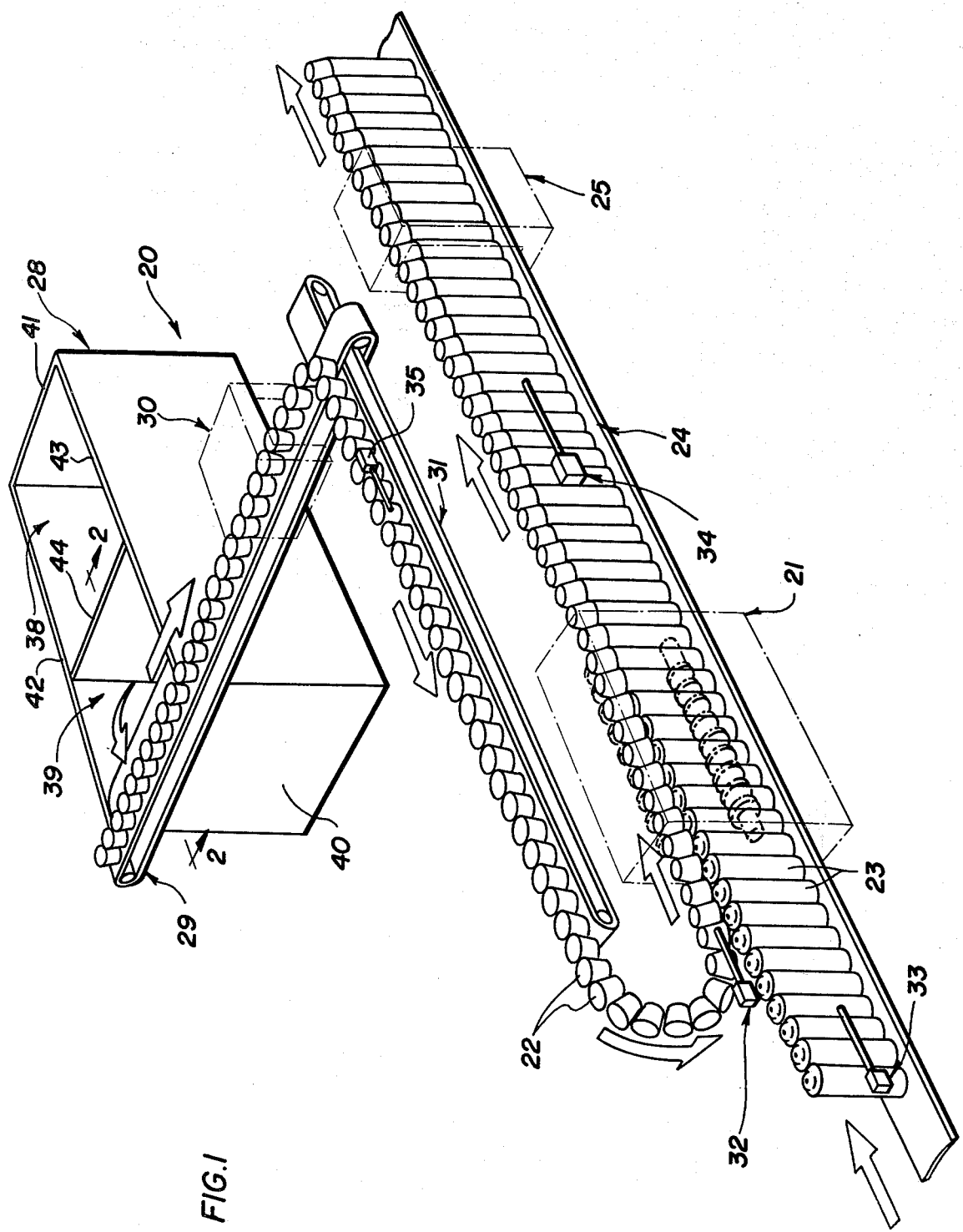
FIG. 1 is a diagrammatic illustration of an overcapping machine associated with a conveyer line which includes the unscrambler of the invention.

Referring now to the drawings, a diagrammatic view of the overall overcapping machine as associated with a conveyer line is illustrated in FIG. 1. The overcap unscrambler according to the invention is generally designated by the numeral 20 and functions to receive caps in random orientation and thereafter properly orient the caps so that they can be delivered to a placer 21 which functions to coordinate the movement between caps 22 in proper orientation with cans 23 so that the caps are placed and generally seated on the cans. The cans 23 move along a conveyer 24 that is positioned adjacent to the unscrambler 20 and in alignment with the placer 21 wherein the cans essentially are moved through the placer. In the event the caps 22 are not seated on the cans 23 during processing by the placer 21 perhaps by virtue of a radially distorted cap, a seater 25 downline from the placer 21 will function to seat such radially distorted caps on the cans. Also, in the event it is not intended that the placer 21 seat the caps on the cans, the seating function is then handled by the seater 25. It will be understood that the conveyer 24 is continuously driven, thereby continuously bringing a supply of cans 23 in the placer 21 except where for some reason the can supply is exhausted upline from the placer, and accordingly, it is important to thereby maintain a continuous supply of caps for the placer 21. The overall operation thereby depends much on the speed of the unscrambler 20 which forms an important part of the overall overcapping machine.

Once the aerosol cans 23 have been capped, they may then be packaged in suitable boxes or the like for shipment. Prior to delivery of the cans to the placer, it can be appreciated that they will have been filled with a product suitably put under pressure and tested for leakage. The cooperative arrangement between the unscrambler, the placer, the conveyer and the seater does not form a part of the present invention. Moreover, the subject matter of the placer and the seater form no part of the present invention but are being more fully treated as separate inventions in other applications as they independently constitute inventions. The present application is concerned only with the unscrambler.

The unscrambler 20 includes generally an unscrambling hopper 28, a discharge conveyer 29 and a final inspection and rejection apparatus 30. For purposes of further understanding the overall overcapping machine once the caps leave the unscrambler, they are in properly oriented position and are then transferred to a transfer conveyer 31 which takes them to an inverter at the head of the placer 21 that inverts the caps to the right-side-up position for placement onto the aerosol cans.

A mechanical sensor 32 ahead of the placer and associated with the cap line through suitable mechanism will stop the placer in the event the supply of evercaps is exhausted. Similarly, a mechanical sensor 33 located ahead of the placer and in association with the can line will function to stop the placer in the event the can supply is exhausted. A mechanical sensor 34 at the discharge end of the placer 21 is associated with the can line to sense a buildup of cans downline from the placer, in which event it functions to also stop the placer. Finally, a mechanical sensor 35 along the cap line downline from the inspection and rejection station and preferably along the transfer conveyer 31 stops the unscrambler when sensing a buildup of caps. Accordingly, the placer is protected against jamming and malfunctioning and the discharge of cans without caps. The line conveyor 24 does not stop when the placer is disabled, and will essentially slide relative the can bottoms of the cans stopped in the placer. While not shown, it will be appreciated that suitable guide rails will be provided for guiding the single-file movement of the caps 22 to the placer. Also, guide rails will be provided for guiding the cans along the conveyer 24. While not specifically shown, the conveyor 24 is preferably made of interconnected sections of rigid plastic which enables the cans to be easily slid laterally or otherwise of the conveyer when moving along the conveyer line and especially through the placer and the seater. The discharge conveyer 29 and the transfer conveyer 31 are suitably made of a continuous flexible natural or synthetic material in the form of belts.

Figure 2:
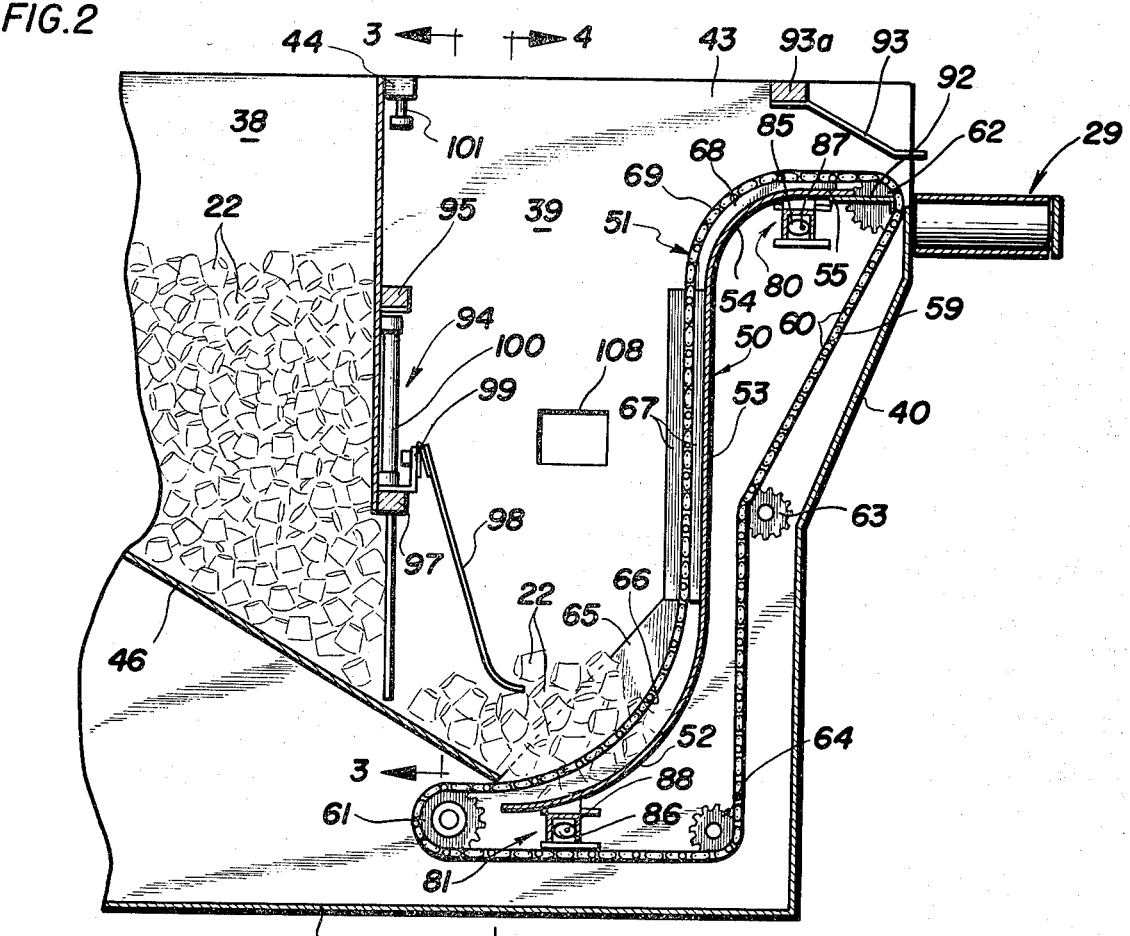
FIG. 2 is a fragmentary enlarged vertical sectional view taken through a part of the unscrambler hopper of the overcap unscrambler according to the invention and taken substantially along line 2—2 of FIG. 1.

As seen particularly in FIGS. 1 and 2, the unscrambling hopper 28 includes a first compartment 38 that receives the caps 22 in random orientation and a second compartment 39 that may be termed the unscrambling compartment, which receives a metered amount of caps from the first compartment 38 and unscrambles them to remove them from the hopper in an oriented fashion. The hopper generally includes a front wall 40, a rear wall 41, opposed side walls 42 and 43, a dividing partition or wall 44 and a bottom wall 45. The upper end of the hopper is open by providing the upper end of the first and second compartments open to facilitate the dumping of caps in random orientation in the first compartment 38 and to facilitate inspection and adjustment of the unscrambling mechanism in the second compartment 39. Within the hopper, it will be appreciated that an inclined wall 46 extending through the first compartment 38 and partially into the second compartment 39 functions to cause gravitational feed of the caps in the first compartment 38 toward the second compartment 39. The partition 44, as will be more clearly hereinafter explained, includes a gate for metering the supply of caps to the second compartment 39 and therefore the feed of caps from the first compartment to the second compartment so that the cap supply in the second compartment in maintained at a predetermined level.

The caps 22 in the unscrambling compartment 39 are contained between the opposite side walls 42 and 43 and gravitationally move down the inclined bottom wall 46 to the lower end of a slide or upstanding wall 50 which coacts with an unscrambling conveyer 51 in the form of a ladder-like orientation member having a set of movable ladder rails or pusher bars which function to orient the caps and discharge caps from the unscrambling compartment 39 and onto the discharge conveyer 29 in an upside-down position, as represented in FIG. 1.

The slide 50 is generally S-shaped and includes a lower arcuately shaped inlet end 52 leading to an intermediate substantially vertical orientation section 53 which in turn leads to an upper arcuate section 54 that terminates in a relatively flat discharge end section 55, as seen most clearly in FIGS. 2, 5 and 6. A portion of the curvate lower inlet end section 52 which generally extends horizontally coacts with a portion of the inclined bottom wall 46 to define the bottom of the unscrambling compartment 39.

The unscrambling conveyer 51, as seen particularly in FIGS. 2, 4 and 6, includes a pair of opposed endless flight chains 58 and 59 trained about a plurality of sprockets and guide rails and supporting therebetween a plurality of substantially equally spaced apart flights, bars or rails 60 which function to pick up caps at the lower arcuate inlet end section 52 and push them along the slide or wall 53 and lift them up and out of the compartment if they are in proper orientation. Accordingly, the flights 60 act as pushers or pusher bars to ultimately pick up properly oriented caps and discharge them from the unscrambling compartment.

Each flight supporting chain may be pivotally or otherwise attached to a respective end of a flight and is trained about a series of sprockets, as seen in FIG. 2, including a lower sprocket 61 arranged below the bottom of the unscrambling compartment, an upper sprocket 62 arranged at the discharge end of the slide 50 and the discharge opening in the hopper and intermediate sprockets 63 and 64. Driving power may be applied to any of the sprockets, but such is preferably applied to either the upper or lower sprockets in any suitable manner. Additional guidance of the path of the unscrambling conveyer is provided by guide plates or bars supported at each of the side walls 42 and 43, as seen particularly in FIGS. 2 and 6. Lower guide plates 65 defining arcuate guide surfaces 66 against which the flight chains slide define an arcuate path for the unscrambling conveyer in cooperation with the lower inlet end section 52 of the slide 50, preferably as shown in FIGS. 2 and 6. The guide plate 65 is shaped to cause movement of the flight 60 along a path of variable spacing relative to the slide lower end section 52 and where at one point the spacing is greater than at the point where the section 52 joins the section 53 of the slide so as to assure initial engagement of many caps regardless of orientation. Guide plates 67 coact to define a track or groove in which the flight chains move during movement along the vertical orientation section 53 of the slide and where the distance between the flight 60 and the slide is maintained essentially constant. It is generally along this section where improperly oriented caps will tumble or fall back to the bottom of the unscrambling compartment, while caps with their heavy top ends against the slide will be lifted out of the compartment. Completing the guidance of the flight chains, arcuately formed guide plates 68 are provided at the upper end of the conveyer to define guide surfaces 69 of arcuate shape for guiding the flight chains in coaction with the upper arcuate section 54 of the slide 50 and to the upper sprocket 62. Accordingly, the guide plates accurately define the path of the flights 60 carried by the chains 58 and 59 as the flights move through the unscrambling compartment 39 to process and orient the caps before discharging them from the unscrambling hopper.

As illustrated in FIGS. 9, 10 and 11, the caps 22 will fall or tumble back to the bottom of the unscrambling compartment unless they are in proper desired orientation as they are lifted from the unscrambling chamber by being pushed along the slide or upstanding wall 50.

With further reference to FIGS. 15 and 16, each cap includes a generally cylindrical side wall 71, a top end 72 that is generally closed with a top wall, and a bottom end 73 which is generally open. The side wall of the cap illustrated is somewhat tapered or conically shaped, and the cap is structured such that the center of gravity is located along the dash-dot line 74 and closer to the top end than the bottom end. Accordingly, when the cap is being pushed along the slide 50 with the top end cap engaging the slide, as shown in FIG. 9, the center of gravity is between the chain flight 60 acting as a pusher and the slide. This results in maintaining the cap in position with respect to the pushing chain flight so that it is carried upwardly and out of the unscrambling compartment and discharged in an upside-down position onto the discharge conveyer 29. However, if the cap is oriented where the bottom end of the cap engages the slide, as shown in FIG. 10, the center of gravity will be on the side of the flight 60 away from the slide 50, and when the cap reaches a position of nonequilibrium as it moves along the inlet end section 52 of the slide to the section 53, it will fall or tumble gravitationally to the bottom of the unscrambling compartment, as depicted in phantom in FIG. 10. Similarly, the center of gravity will be outside of the pusher flight 60 when the side wall 71 is sliding along the slide 50, as depicted in FIG. 11, where it will also tumble or fall back to the bottom of the unscrambling compartment. It can be appreciated the spaces between the pusher bars will essentially fill with caps of all orientations when the pusher bars are moving along the lower generally horizontal inlet end of the slide, and that those not in proper orientation will fall back to the bottom of the compartment for reprocessing when they are advanced to the generally vertical section 53 of the slide. The distance between adjacent pusher bars is such that the caps will not hang up between adjacent bars when they start to tumble back to the bottom of the compartment. Yet, the bars are preferably close enough so that the speed of orientation is optimum within range of cap sizes intended to be handled by the apparatus. Therefore, the only caps that will be completely lifted from the compartment will be those that are in proper orientation, and which when reaching the upper flight discharge end section 55 of the slide 50 will be in upside-down position.

It should be recognized that the caps 22 referred to herein and illustrated are so structured that the center of gravity is closer to the top end, and it is desired to discharge the caps from the compartment in upsidedown position. In the event the center of gravity were closer to the bottom end of the caps, such caps would be discharged from the compartment in right-side-up position where the top end of the cap is uppermost and the bottom end is riding on the discharge conveyer 29. Accordingly, the unscrambler of the invention will function to unscramble and orient caps where the center of gravity is closer to the top end or caps where the center of gravity is closer to the bottom end. It just happens that all overcaps presently known for aerosol cans have the center of gravity closer to the top end especially by virtue of the closed top end and open bottom end.

The position of the slide or upstanding wall 50 may be easily adjusted by moving the slide horizontally relative conveyer 51 so that the unscrambler can handle caps of varying heights. In this respect, it will be appreciated that the path of the flight chains and flights is fixed relative to the hopper and the distance between the flights and the slide 50 is varied at substantially all points except the upper discharge end when adjusting the position of the slide 50. The mechanism for adjustably pushing the slide 50 includes upper and lower channel-shaped bars 80 and 81 defining respectively downwardly opening grooves 82 and 83, as seen most clearly in FIGS. 2, 5, 6 and 8. The channel-shaped bars 80 and 81 extend beyond the opposite side edges of the slide 50 and are guidably received in tracks defined by horizontally extending guide bars 84 and 85 that are suitably secured to the opposed side walls 42 and 43 of the hopper. Accordingly, the horizontally extending guide bars define horizontally extending tracks and thereby confine movement of the channel-shaped bars 80 and 81 to horizontal paths. Essentially, it will be appreciated that the slide 50 therefore can be moved toward or away from the unscrambling conveyer 51.

In order to synchronize the adjusted position of the slide 50, upper and lower eccentrics 85 and 86 respectively mounted on shafts 87 and 88 engage in the grooves 82 and 83 of the channel bars 80 and 81 and are driven together by a chain and sprocket drive, as shown in FIG. 6. This drive includes a sprocket 89 connected to the upper shaft 87, a sprocket 90 connected to the lower shaft 88, and a connecting chain 91. It can now be appreciated that power applied to one of the shafts will likewise drive the other shaft, thereby driving the eccentrics together to act on the upper and lower channel-shaped bars together, and thereby apply an adjustment action to the upper and lower ends of the slide 50 at the same time which coordinates the relative adjustment between the slide 50 and the unscrambling conveyer 51.

Figure 8:
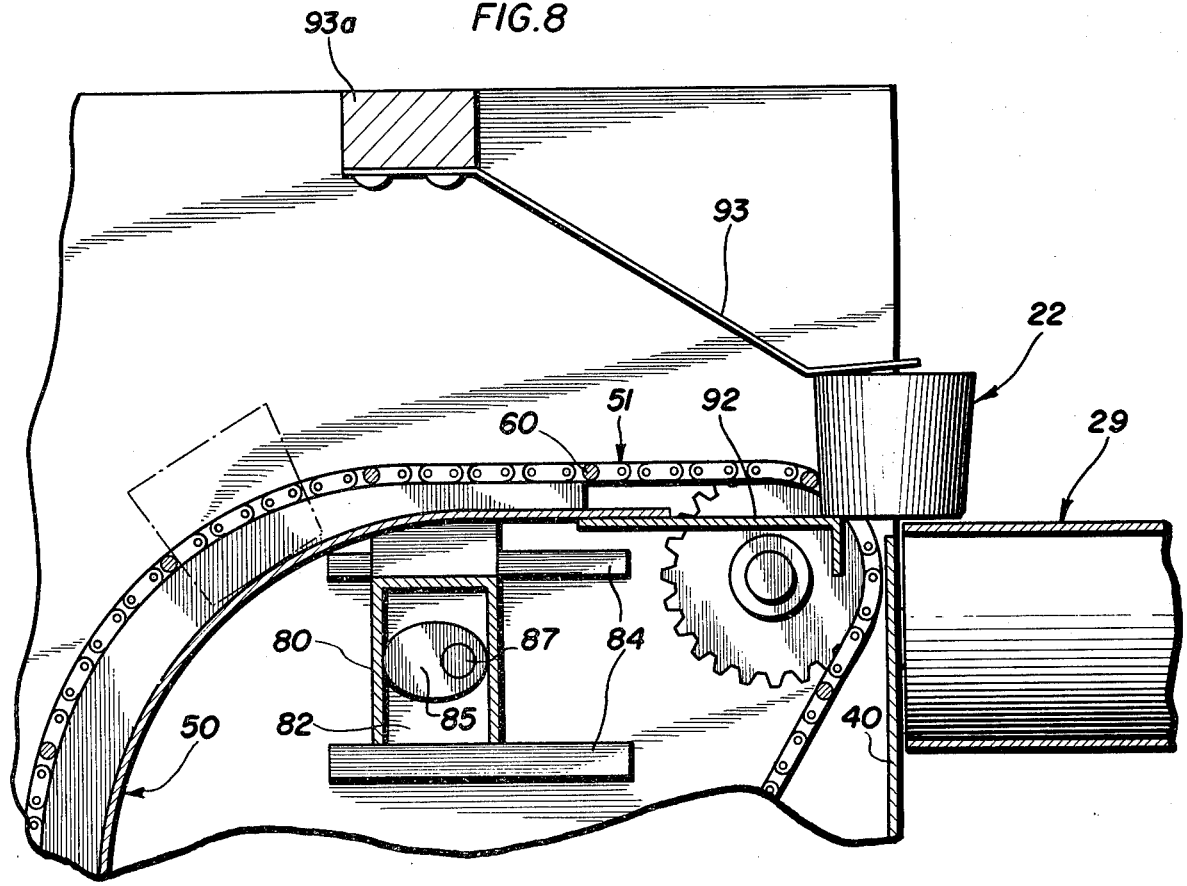
FIG. 8 is a detailed enlarged sectional view taken through the unscrambler hopper and illustrating the discharge of overcaps from the hopper onto a discharge conveyor and particularly illustrating the transfer arrangement that assures proper placement of the caps onto the discharge conveyer.

A stationary discharge plate 92 extending horizontally is provided at the upper discharge end of the unscrambling conveyer 51, as seen most clearly in FIGS. 2 and 8, to facilitate the adjustable provision of the slide 50 and also to provide support for the caps as they are carried over to the discharge conveyer 29. The discharge plate 92 terminates short of the front wall 40 so as to define an opening through which the flights 60 of the unscrambling conveyer 51 can move when returning to the inlet end of the conveyer at the bottom of the unscrambling compartment. Further, a slight gap is defined between the inlet end of the slide and the bottom wall 46 at the bottom of the unscrambling compartment for the pusher bars 60 to pass through.

Inasmuch as a slight gap is defined between the discharge conveyer 29 and the discharge plate 92, means is provided to support the caps 22 when the leading edges of the cap traverse this gap to prevent them from tilting and possibly toppling over into their sides. This means includes a plurality of spring fingers 93 supported from a crossbar 93a extending between opposite side walls of the hopper, as seen particularly in FIGS. 2, 4 and 8. The spring fingers engage the top ends of the caps and coact with the discharge plate to maintain the caps in the upside-down position and support the leading edge as it crosses the gap between the discharge plate and the discharge conveyer so as to assure placement of the caps onto the conveyer 29 in the oriented upside-down positions. It will be appreciated that the discharge plate 92 is suitably supported between the hopper side walls. Suitable locking means may be provided for locking the eccentrics in an adjusted position.

Figure 3:
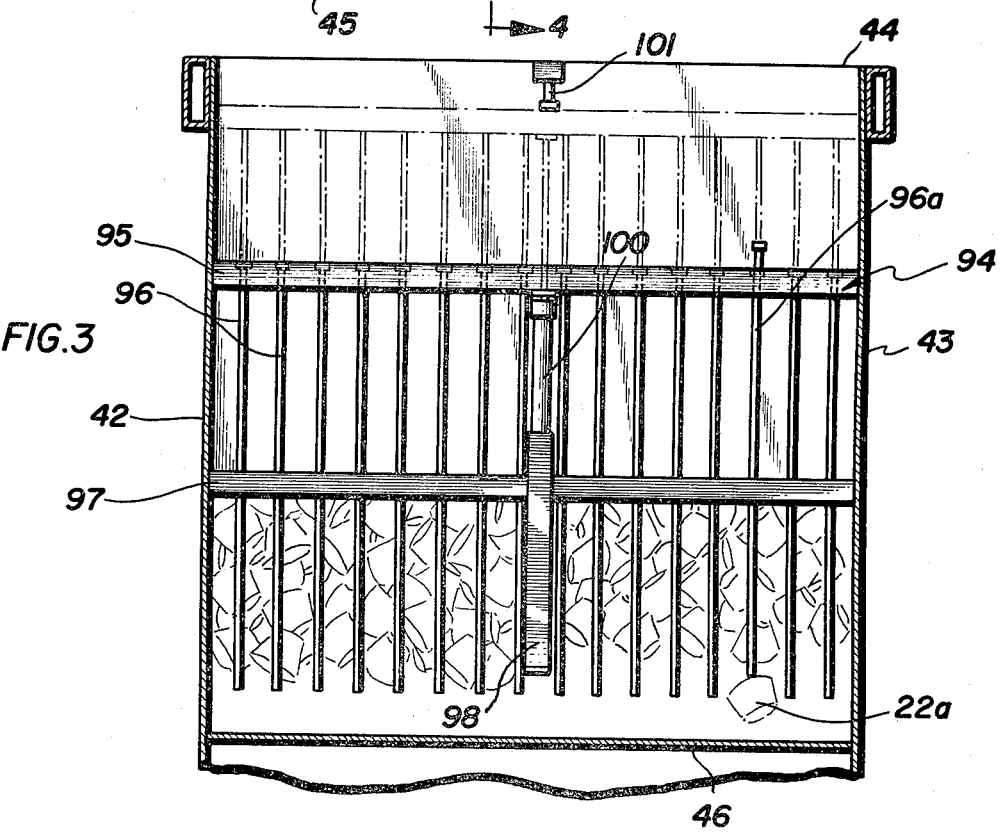
FIG. 3 is a vertical sectional view taken substantially along line 3—3 of FIG. 2 and showing in elevation the gate for metering the caps to the unscrambling compartment of the hopper for the overcaps and illustrating the gate in solid lines in lowered position and partially in phantom in raised position.

The supply of caps to the unscrambling chamber 39 is metered from the supply compartment 38 by a gate 94 illustrated particularly in FIGS. 2 and 3 which coacts with the partition wall 44 that extends from the top of the hopper downwardly and terminates above the inclined bottom wall 46, thereby defining an opening which is controlled by the gate 94. The gate includes an upper transversely extending rod support bar 95 carrying a plurality of vertically extending and parallel spaced rods 96 spaced apart such that caps cannot pass therebetween. The rods are guidably movable through a guide bar 97 arranged at the upper end of the opening. Moreover, the guide bars are provided with the heads at their upper ends coacting with the support bar 95 such that downward movement of the rods is limited by the support bar, while upward movement is not limited, as illustrated by the rod 96a in FIG. 3, which depicts trapping a cap 22a against the bottom wall 96. Such can take place when the gate is raised so that the rods will permit caps to flow through the opening into the unscrambling compartment gravitationally and thereafter lowered where one or more caps may be caught between the lower ends of the rods and the bottom wall 46. Downward movement of the rods relative to the support bar 95 is only by gravity and the weight of the rods is such that they will not destroy a cap in the event they engage a cap, as shown in FIG. 3.

The metering action of the gate results from a mechanical detector including an arm 98 which is pivotally mounted to a bracket 99 carried by the guide bar 97 that in turn is attached to the wall 44. The arm 98 is freely swingable, and when it swings downwardly by detecting an absence of caps between its lower end and the bottom of the unscrambling compartment, it will actuate a fluidic switch to energize a pneumatic cylinder 100 which is arranged between the guide bar 97 and the rod support bar 95 and which will drive the support bar to the upper position against a stop 101, as shown in phantom in FIG. 3. Accordingly, the caps will be delivered from the supply compartment 38 to the unscrambling compartment 39 as needed, and thereby not overload the unscrambling conveyer. After the caps move into the unscrambling chamber and push the arm 98 outwardly, such will effect de-energization of the pneumatic cylinder 100 and dropping of the gate 94 to prevent further movement of caps into the unscrambling chamber. Therefore, the gate arm 98 detects the level of caps at the bottom of the unscrambling compartment, and only a metered amount of caps will be transferred from the supply compartment 38 to the unscrambling compartment 39. A time delay is built into the fluidic switch operated by the arm 98 to avoid chattering of the gate cylinder.

It will be appreciated that the unscrambler is intended to operate at a relatively high speed. Accordingly, it is possible that occasionally a cap may end up on the discharge conveyer 29 in the undesired right-side-up position or on its side as it is discharged from the unscrambling compartment. In order to prevent such an improperly oriented cap to be fed to the placer 21, a final inspection of cap orientation is made by the inspection and rejection apparatus 30 at a station which is positioned along the discharge conveyer and just outside of the unscrambling compartment. All caps are inspected at this station, and improperly oriented caps are rejected and returned to the unscrambling compartment 39 of the hopper for reprocessing.

Figure 7:
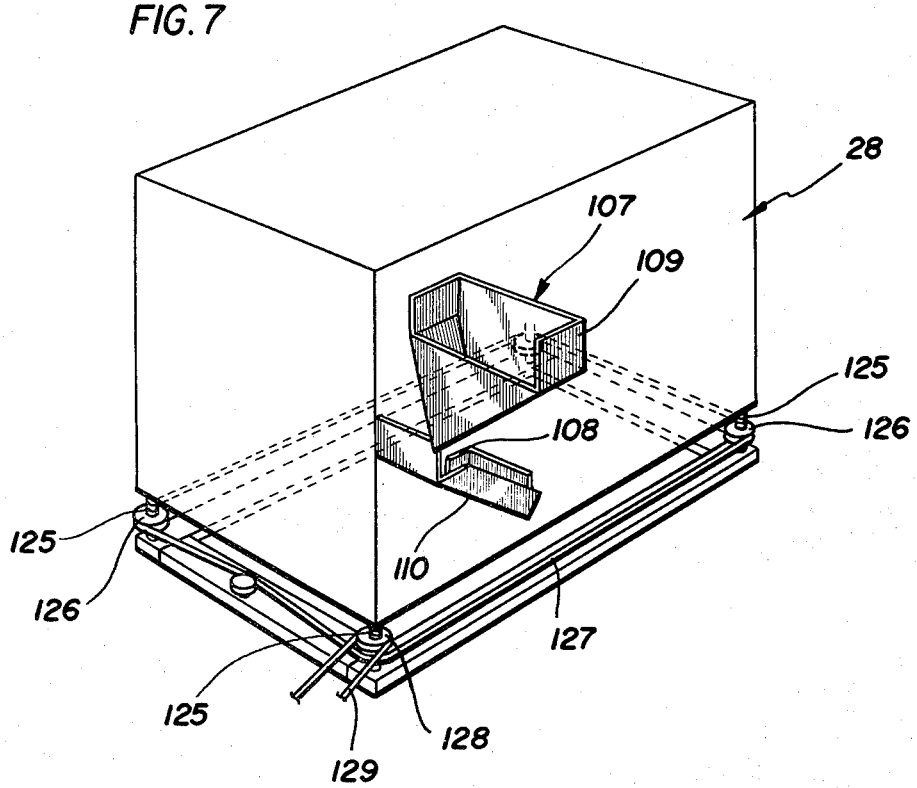
FIG. 7 is a somewhat perspective and diagrammatic view of the unscrambling hopper and illustrating the manner in which the hopper may be vertically adjusted when adjusting the overall overcapping machine for handling cans of different heights.

As seen most clearly in FIGS. 12, 13 and 14, the gaps 22 are transferred from the unscrambling compartment to the discharge conveyer in single file and then guided by means of guide rails 106, FIG. 12, to the inspection and rejection station 30 which is aligned with an opening along the discharge conveyer leading to a return chute assembly 107 that returns rejected caps gravitationally through an opening 108, FIGS. 2 and 7, in the side wall 43 of the hopper to the unscrambling compartment. The return chute assembly includes upper and lower chutes 109 and 110 arranged to guide rejected caps gravitationally through the opening 108 into the unscrambling compartment 39 of the unscrambling hopper. In the event caps are not in single file as they move past the reject station, they will be crowded off the discharge conveyer into the return chute assembly 107 for return to the unscrambling compartment, since it is possible to inspect the caps for orientation only if they are in single file.

The station 30 includes fluidically controlled air jets that are triggered if they inspect a cap and find it is not properly oriented to blow the cap from the conveyer into the return chute assembly. As shown in FIGS. 12 to 14, a mechanical sensing arm 114 is positioned above the conveyer 29 a distance such that if the caps are resting on either end, they will pass by, but if they are resting on their side, as shown specifically in FIG. 14, the arm 114 will be displaced to operate a fluidic switch and trigger an air nozzle 115 that will shoot a blast of air and eject the cap from the conveyer into the return chute assembly. Here, it will be appreciated the diameter of each cap is greater than the height.

In the event the cap is in an upright position, whether it is resting on its top end or bottom end, it will pass the mechanical sensing arm 114, and it will then be inspected by a pair of fluidic sensors 118 and 119. In the event these sensors, which are arranged side by side, detect that the cap is in right-side-up position, as shown in FIG. 16, they will trigger a fluidic switch and energize an air nozzle 120 which will shoot a blast of air at the cap so detected to eject it from the discharge conveyer and into the return chute. The fluidic sensors 118 and 119 function, as shown in FIGS. 15 and 16, such that when either of them detects a sufficient resistance or back pressure as possible by the top end of a cap, as seen in FIG. 16, the air nozzle 120 will be energized. When the sensors see the relatively thin edges of the side wall 71 of the caps, as shown in FIG. 15, they will not sense a sufficient amount of interruption to trigger the fluidic switch and energize the air nozzle so that such a cap will pass by this station. Accordingly, the inspection and rejection station 30 accomplishes a final inspection of the caps to assure they are in properly oriented relation before being delivered to the transfer conveyer 31 and ultimately the placer 21 by first determining whether the caps are sitting upright or on their sides and secondly by determining which end is up.

While not shown, it will be appreciated after viewing FIG. 1 that suitable guide means will be provided for effecting the transfer of the caps from the discharge end of the discharge conveyer 29 to the inlet end of the transfer conveyer 31.

Where it would be necessary to adjust the placer and/or seater to handle cans of varying heights, it would also be necessary to adjust the height of the unscrambler. While not shown, the unscrambler hopper, together with the discharge and transfer conveyers, would move vertically for adjusting to handle aerosol cans of different heights in the line. For movement of the unscrambler hopper 28, a plurality of jack screws 125 is provided, one at each corner of the hopper associated with nuts held by the hopper and rotatable together by means of sprockets 126 and locked to the jack screws and a chain 127 trained over the sprockets so that each corner of the hopper moves up and down in synchronism. Additionally, a drive sprocket 128 may be provided on one of the jack screws in connection with a chain 129, which would be driven from the adjusting mechanism provided for adjusting the placer as well as the discharge and transfer conveyers. This adjusting mechanism is illustrated particularly in FIG. 7.

It will be understood that modifications and variations may be effected without departing from the scope of the novel concepts of the present invention, but it is understood that this application is to be limited only by the scope of the appended claims.

The invention is hereby claimed as follows:

1. Apparatus for unscrambling and orienting can overcaps for placement onto cans, where each overcap is generally cylindrical in cross section, generally open at the bottom end and generally closed at the top end, of a diameter greater than the height, and constructed to have a center of gravity closer to one end than the other end, said apparatus comprising an unscrambling and orientation compartment for receiving a supply of overcaps, and unscrambling and orientation means in the compartment for engaging the overcaps at the bottom of the compartment, elevating and orienting the overcaps, and discharging the overcaps from the upper end of the compartment in a given oriented position, said unscrambling and orientation means including an upstanding slide having a lower section and an upper substantially vertical section and a set of pusher bars continually movable upwardly along the slide and in closer spaced relation therewith at the vertical section than at the lower section so as to push and lift overcaps from the compartment that are oriented such that their center of gravity is located between a pusher bar and the slide during movement along the substantially vertical section, and said slide including means for adjusting its position relative the pusher bars to accommodate overcaps of various heights.

2. Apparatus for unscrambling and orienting can overcaps for placement onto cans, where each overcap is generally cylindrical in cross section, generally open at the bottom end and generally closed at the top end, of a diameter greater than the height, and constructed to have a center of gravity closer to one end than the other end, said apparatus comprising an unscrambling and orientation compartment for receiving a supply of overcaps, and unscrambling and orientation means in the compartment for engaging the overcaps at the bottom of the compartment, elevating and orienting the overcaps, and discharging the overcaps from the upper end of the compartment in a given oriented position, said unscrambling and orientation means including an upstanding slide having a lower section and an upper substantially vertical section and a set of pusher bars continually movable upwardly along the slide and in closer spaced relation therewith at the vertical section than at the lower section so as to push and lift overcaps from the compartment that are oriented such that their center of gravity is located between a pusher bar and the slide during movement along the substantially vertical section, and said slide being generally S-shaped and including means for adjusting its position relative the pusher bars to accommodate overcaps of various heights, said pusher bars extending substantially horizontally in spaced coacting relation to the slide and movable upwardly to engage and discharge from the hopper overcaps oriented to have the heavy ends slidable along the slide, and means for feeding overcaps into said compartment to generally maintain a minimum supply and prevent an oversupply, said overcap feeding means including a supply compartment for overcaps, an opening in the bottom leading to the unscrambling and orientation compartment, a gate movable between open and closed positions relative the opening, and means in the unscrambling and orientation compartment detecting the supply of overcaps therein and operating the gate to control movement of overcaps from the supply compartment to the unscrambling and orientation compartment.

3. Apparatus as defined in claim 2, and an inspection and reject mechanism for receiving overcaps discharged from the unscrambling and orientation compartment and returning any improperly oriented overcaps to said compartment.

4. Apparatus as defined in claim 3, wherein said mechanism includes a mechanical sensor inspecting the height of each overcap and rejecting those resting on their sides, and fluidic sensor means inspecting the uppermost end of each overcap and rejecting those not having a given end in the upward position.

5. Apparatus for unscrambling and orienting overcaps for placement onto aerosol cans, where each overcap is generally cylindrical in cross section, generally open at the bottom end and generally closed at the top end, of a diameter greater than the height, and constructed to have a center of gravity closer to the top end than the bottom end, said apparatus comprising a hopper having first and second compartments separated by a common vertical partition, a bottom wall in said first compartment inclined downwardly and toward said second compartment and extending partly into said second compartment, an opening in said vertical partition at the bottom wall, gate means for controlling the gravitational flow of overcaps from the first compartment into said second compartment, said gate means including means in the second compartment sensing the supply of overcaps therein for operating the gate and maintaining a minimum number of overcaps in said second compartment, a gate having a vertically movable crossbar, a plurality of vertical rods suspended from the crossbar and individually movable upwardly relative the crossbar to prevent damage to overcaps in the downward path of the lower ends of the rods during a closing cycle of the gate, and stationary guide means for said rods, and unscrambling and orientation means in said second compartment for engaging overcaps at the bottom thereof, orienting the overcaps, and discharging the overcaps from the upper end of said second compartment in a given oriented position, said unscrambling and orientation means including an upstanding slide having a lower section and an upper substantially vertical section and a set of pusher bars continually movable upwardly along the slide and in closer spaced relation therewith at the vertical section than at the lower section so as to push and lift overcaps from the compartment that are oriented such that their center of gravity is located between a pusher bar and the slide during movement along the substantially vertical section, said slide being generally S-shaped and said pusher bars extending substantially horizontally in spaced coacting relation to the slide and movable upwardly to engage and discharge from the hopper overcaps oriented to have the top ends slidable along the slide, said pusher bars being spaced apart a distance greater than the diameter of an overcap, said lower section extending generally horizontally and onto which the overcaps are gravitationally supplied, said substantially vertical section operable to dump overcaps back to the bottom of the compartment if the sides or bottom ends are riding against the slide, and an upper generally horizontal discharge section for transferring the properly oriented overcaps from the compartment.

6. Apparatus for unscrambling and orienting overcaps for placement onto aerosol cans, where each overcap is generally cylindrical in cross section, generally open at the bottom end and generally closed at the top end, of a diameter greater than the height, and constructed to have a center of gravity closer to the top end than the bottom end, said apparatus comprising a hopper having first and second compartments separated by a common vertical partition, a bottom wall in said first compartment inclined downwardly and toward said second compartment extending partly into said second compartment, an opening in said vertical partition at the bottom wall, gate means for controlling the gravitational flow of overcaps from the first compartment into said second compartment, and unscrambling and orientation means in said second compartment for engaging overcaps at the bottom thereof, orienting the overcaps, and discharging the overcaps from the upper end of said second compartment in a given oriented position, said unscrambling and orientation means including an upstanding slide having a lower section and an upper substantially vertical section and a set of pusher bars continually movable upwardly along the slide and in closer spaced relation therewith at the vertical section than at the lower section so as to push and lift overcaps from the compartment that are oriented such that their center of gravity is located between a pusher bar and the slide during movement along the substantially vertical section, said slide including means for adjusting its position relative the pusher bars to accommodate overcaps of various heights, said slide being generally S-shaped and said pusher bars extending substantially horizontally in spaced coacting relation to the slide and movable upwardly to engage and discharge from the hopper overcaps oriented to have the top ends slidable along the slide, said pusher bars being spaced apart a distance greater than the diameter of an overcap, said lower section extending generally horizontally and onto which the overcaps are gravitationally supplied, said substantially vertical section operable to dump overcaps back to the bottom of the compartment if the sides or bottom ends are riding against the slide, and an upper generally horizontal discharge section for transferring the properly oriented overcaps from the compartment, and a conveyer belt at the upper end of the second compartment moving at right angles to the path of the pusher bars and being at the same level as the discharge section of the slide for receiving the oriented overcaps discharged from the slide.

7. Apparatus for unscrambling and orienting hollow bodies having one closed end and having a center of gravity closer to one end, said apparatus comprising, a hopper for receiving a plurality of bodies in random orientation, an upstanding slide having its bottom end in the hopper and toward which the bodies gravitationally move for engagement therewith, an endless conveyer having a plurality of horizontally extending flights movable adjacent and around said slide, said slide including means adjusting its position relative the flights to accommodate hollow bodies of various heights, means causing said flights to move in a fixed spaced relation to the slide on the side facing the hopper such that the flights are spaced from the slide at the lower end to pick up and move along and upwardly of the slide nearly all bodies contacting the slide and spaced from the slide at the upper end closer than at the lower end such that the bodies will tumble back to the hopper unless the end closest the center of gravity engages the slide.

* * * * *

UNITED STATES PATENT AND TRADEMARK OFFICE
CERTIFICATE OF CORRECTION

PATENT NO. : 3,924,732
DATED : December 9, 1975
INVENTOR(S) : George E. Leonard

It is certified that error appears in the above-identified patent and that said Letters Patent are hereby corrected as shown below:

```
Col. 3, line 67, change "evercaps" to --overcaps--;
Col. 4, line 53, change the second occurrence of "in"
                to --is--;
Col. 7, line 52, change "into" to --onto--;
Col. 8, line 65, change "gaps" to --caps--; and
Col. 12, line 19, after "compartment insert --and--.
```

Signed and Sealed this

Sixth Day of July 1976

[SEAL]

Attest:

RUTH C. MASON
Attesting Officer

C. MARSHALL DANN
Commissioner of Patents and Trademarks